(12) United States Patent
Kubo

(10) Patent No.: US 7,059,681 B2
(45) Date of Patent: Jun. 13, 2006

(54) HEADREST FOR VEHICLE SEAT

(75) Inventor: Yoshiaki Kubo, Tokyo (JP)

(73) Assignee: Tachi-S Co., Ltd., Tokyo (JP)

( * ) Notice: Subject to any disclaimer, the term of this patent is extended or adjusted under 35 U.S.C. 154(b) by 44 days.

(21) Appl. No.: 10/765,907

(22) Filed: Jan. 29, 2004

(65) Prior Publication Data

US 2005/0168038 A1 Aug. 4, 2005

(51) Int. Cl.
*B60N 2/48* (2006.01)
*B60N 2/02* (2006.01)

(52) U.S. Cl. .............. 297/410; 297/61; 297/378.12; 297/335

(58) Field of Classification Search .............. 297/61, 297/335, 408, 410, 378.12, 336; 296/65.01, 296/65.05, 65.16
See application file for complete search history.

(56) References Cited

U.S. PATENT DOCUMENTS

| | | | |
|---|---|---|---|
| 2,652,101 A * | 9/1953 | Samsky et al. | 297/114 |
| 2,984,293 A * | 5/1961 | Bontempi et al. | 297/61 |
| 3,065,029 A * | 11/1962 | Spound et al. | 297/391 |
| 4,082,354 A * | 4/1978 | Renner et al. | 297/410 |
| 5,641,202 A * | 6/1997 | Rus | 297/335 |
| 5,681,079 A * | 10/1997 | Robinson | 297/61 |
| 5,826,942 A * | 10/1998 | Sutton et al. | 297/378.12 |
| 5,918,940 A * | 7/1999 | Wakamatsu et al. | 297/410 |
| 6,193,317 B1 * | 2/2001 | Mitschelen et al. | 297/378.1 |
| 6,557,933 B1 * | 5/2003 | Schambre et al. | 297/61 |
| 6,779,839 B1 * | 8/2004 | Andreasson et al. | 297/61 |

FOREIGN PATENT DOCUMENTS

| | | |
|---|---|---|
| JP | 11-290154 A | 10/1999 |
| JP | 2001-500396 | 1/2001 |

* cited by examiner

*Primary Examiner*—Peter M. Cuomo
*Assistant Examiner*—Joe Edell
(74) *Attorney, Agent, or Firm*—Browdy and Neimark, PLLC

(57) ABSTRACT

Headrest for vehicle seat, having generally "inverted L" shape in section comprising a horizontal top portion and a vertical support portion. A headrest stay element provided to the horizontal top portion is slidable vertically on a seat back. The vertical support portion is rotatable or swingable relative to the horizontal top portion in forward and backward directions, and normally biased in the forward direction so as to resiliently support a head, shoulder and upper back portions of a seat occupant without giving unpleasant protrusive touch thereto. The headrest stay element is operatively connected with a seat cushion of the seat, such that flipping over of the seat cushion automatically causes the headrest to lower to the seat back, thereby allowing the seat back to fold down without contact of the headrest with the seat cushion.

4 Claims, 4 Drawing Sheets

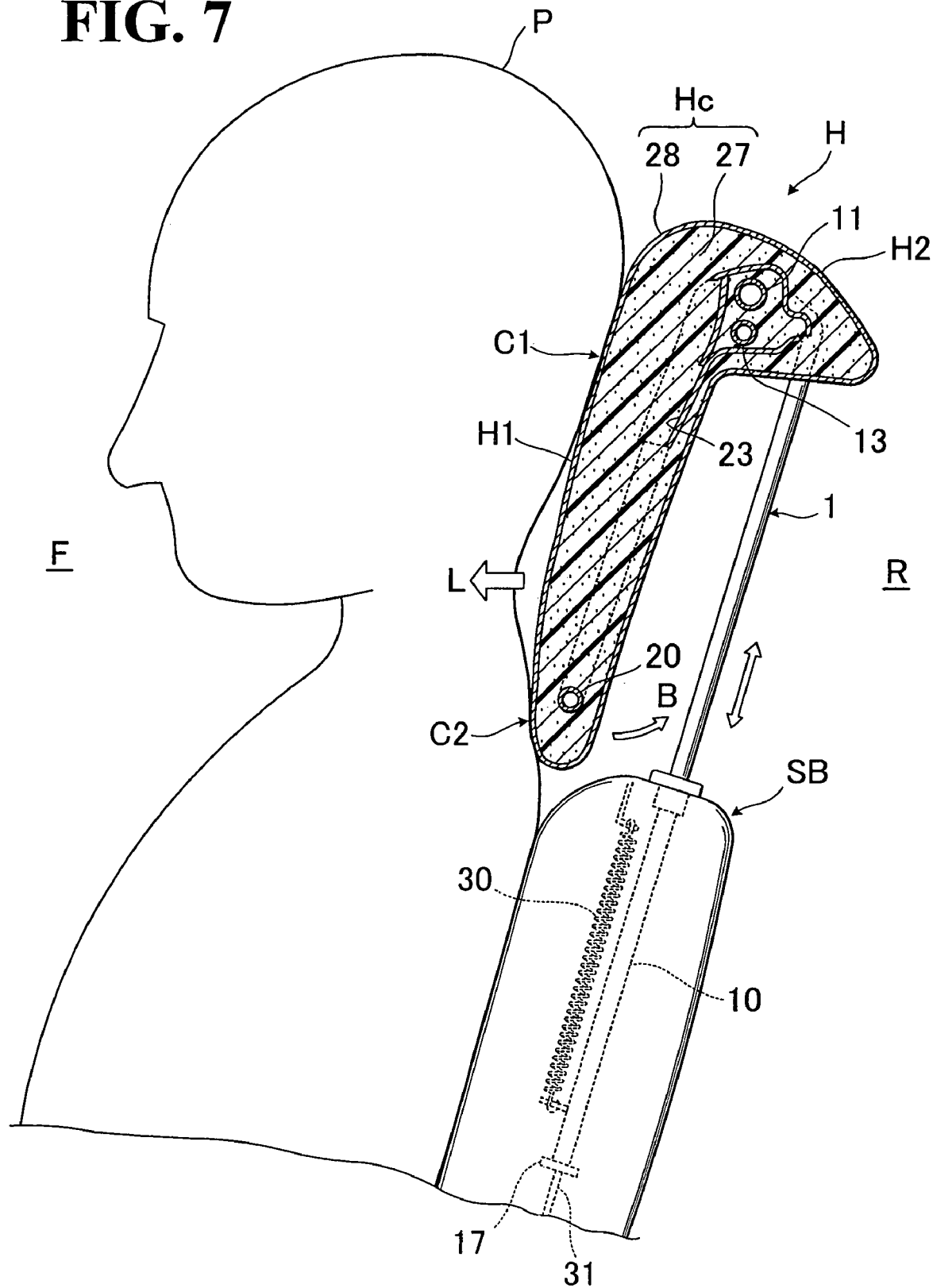

HEADREST FOR VEHICLE SEAT

BACKGROUND OF THE INVENTION

1. Field of the Invention

The present invention relates to a headrest for use on a vehicle seat. In particular, the invention is directed to a headrest of generally "inverted L" shape in section which is movably mounted in a foldable seat back used in a rear seat or the like.

2. Description of Prior Art

A headrest having a generally "inverted L" shaped in section is known, which comprises a horizontal top portion and a vertically extending support portion. This particular headrest configuration is intended to reduce a height of a seat back on which the headrest is mounted with a view to attaining as wide space as possible in the cabin space in such vehicles as van or wagon cars. Additionally, such headrest configuration advantageously minimizes a circular orbit of the headrest relative to a rotation center of seat back when folding the seat back to a horizontal non-use position, thereby preventing contact of the headrest with other seat or seat elements.

For example, the Japanese Laid-Open Patent Publication No. 11-290154 discloses the forgoing generally "inverted L" shape of headrest which is attached on a seat back in such a manner that the vertically extending support portion thereof overhangs the top and forward upper portions of the seat back.

But, the conventional headrest of this type has been found defective in that the vertically extending support portion thereof projects forwardly from the forward surface of seat back, which frequently gives an unpleasant hard touch and forward protrusive touch to the head, shoulder and back portions of an occupant on the seat. Further, there has been no headrest of this type used in a fold-down seat comprising foldable seat back and seat cushion, wherein the headrest is automatically lowered to and contacted on the seat back when flipping over the seat cushion to an upright non-use position, thereby insuring to prevent contact of the headrest with the seat cushion when folding down the seat back.

SUMMARY OF THE INVENTION

In view of the above-stated drawbacks, it is a primary purpose of the present invention to provide an improved headrest for vehicle seat, which avoids the foregoing unpleasant hard touch to the shoulder and back portion of an occupant on the vehicle seat.

In order to achieve such purpose, a headrest of the present invention is basically comprised of:
- a headrest body of a generally "inverted L" shape in section, which has a generally horizontal top portion and a generally vertical support portion extending vertically from the generally horizontal top portion, wherein the generally vertical support portion is rotatably connected with the generally horizontal top portion so as to be swingable relative thereto in forward direction and backward direction of the vehicle seat;
- a headrest stay means vertically extending from the generally horizontal top portion of headrest body, the headrest stay means being slidably inserted through a top of the seat back, thereby allowing the headrest body to be vertically movable toward and away from the seat back; and
- a biasing means for resiliently biasing the generally vertical support portion in the forward direction, with such an arrangement that, when the headrest body is moved donwardly to the seat back, the generally horizotnal top portion of hedrest body is contacted on the top of seat back, while the generally vertical support potion of headrest body is contacted on and along an upper region of forward surface of seat back.

Accordingly, the headrest is resiliently biased in the forward direction by the biasing means, while being rotatable backwardly, to thereby give a cushiony and comfortable support touch to the head, shoulder and upper back portions of a seat occupant who therefore does not feel any unpleasant protrusiveness there.

Preferably, the headrest stay means is normally biased upwardly by another biasing means provided in the seat back, such that said headrest body is resiliently retained at a predetermined position to support the head, shoulder and back portions of the seat occupant.

It is another purpose of the present invention to avoid contact and interference of the headrest with a seat cushion of the seat which is flipped over to an upright non-use position when the seat back with the headrest is folded downwardly to a horizontal non-use position.

For that purpose, the seat cushion has a forward end portion facing forwardly of the vehicle, the forward end portion being rotatably connected with a floor so as to allow the seat cushion to be flipped over relative to the forward end portion to an upright non-use position, and the seat back is rotatably connected to the floor at the lower end portion thereof, thereby allowing the seat back to be folded downwardly about the lower end portion to a horizontal non-use position. Further, a wire is at one end thereof connected with the seat cushion, while being at another end thereof connected with the headrest stay means, so that, upon the seat cushion being flipped over to the upright non-use position, the wire is drawn in a direction to the seat cushion, which in turn causes the headrest stay means as well as the headrest body to move donwardly to said seat back, so that the generally horizontal top portion of headrest body is contacted on the top of seat back, while the generally vertical support potion of headrest body is contacted on and along the upper region of forward surface of seat back, thereby allowing the seat back to be folded downwardly to the non-use horizontal position, without contact of the headrest body with the seat cushion.

Other features and advantages of the invention will become apparent from reading of the description hereinafter, with reference to the annexed drawings.

BRIEF DESCRIPTION OF THE DRAWINGS

FIG. 7 is a diagram fragmentary in section, which shows the state where a seat occupant uses the headrest.

DETAILED DESCRIPTION OF PREFERRED EMBODIMENT OF THE INVENTION

Referring to FIGS. 1 to 7, there is illustrated a preferred embodiment of headrest (H) in combination with a vehicle seat (S) in accordance with the present invention.

Figure 1:
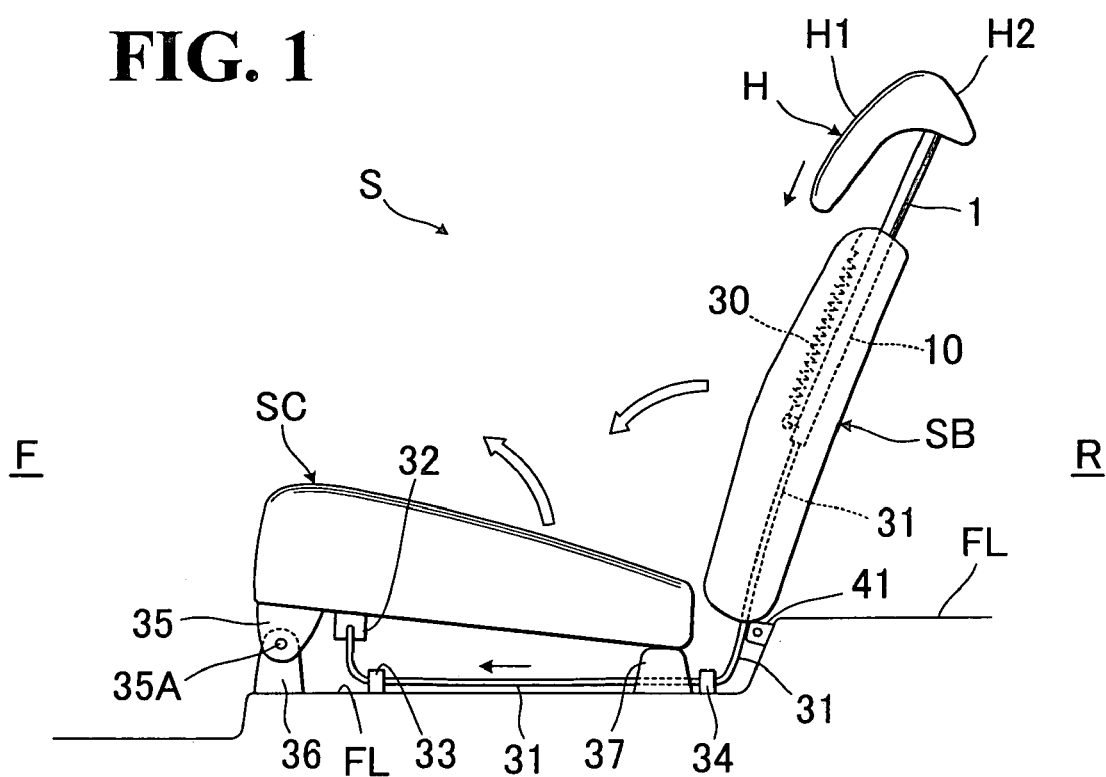
FIG. 1 is a schematic side elevational view of a vehicle seat provided with a headrest in accordance with the present invention, which shows the headrest to be in a normal use position.
Figure 2:
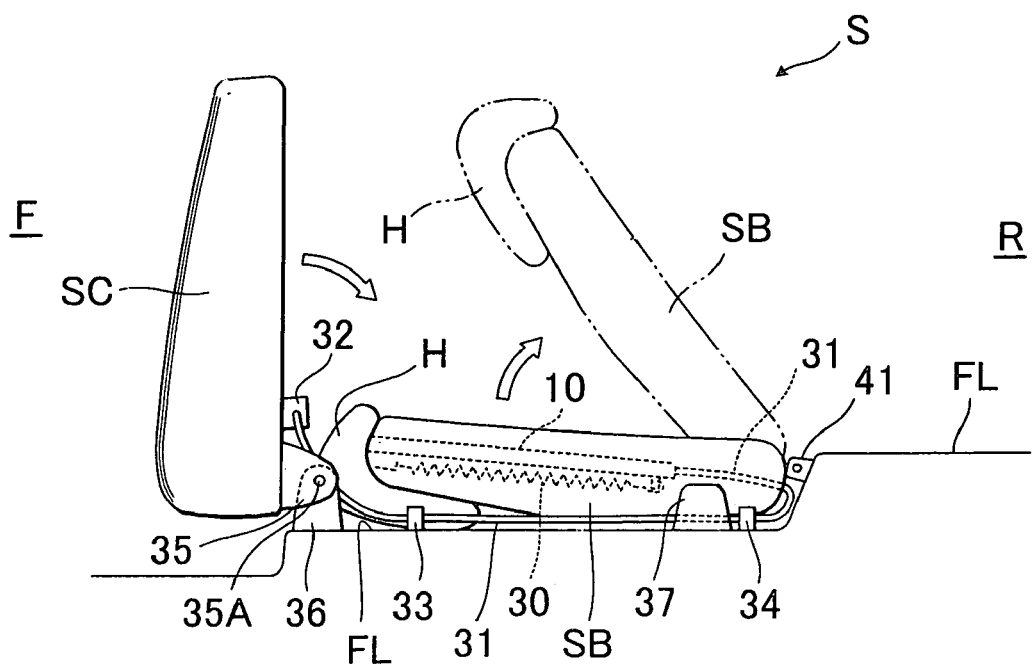
FIG. 2 is a schematic side elevational view of the vehicle seat provided with the headrest, showing the state where the headrest is lowered to a seat back of the seat folded down to a horizontal non-use position, while a seat cushion of the seat is set in an upright non-use position.

As shown in FIGS. 1 and 2, the vehicle seat (S) is of a known fold-down type comprising a seat cushion (SC) and a seat back (SB), both of which are foldable vertically with a view to widening a backward space in the load-carrying platform in a vehicle (not shown). In brief, the seat cushion (SC) has a hinge bracket (35) provided in the forward end thereof, wherein the hinge bracket (35) is rotatably connected by a hinge pin (35A) with a forward support bracket (36) fixed on the vehicle floor (FL). Normally, as in FIG. 1, the seat cushion (SC) is set in a generally horizontal use position, with a free backward end thereof resting on a backward support bracket (37), but, the seat cushion (SC) may be flipped forwardly about the hinge pin (35A), as indicated by the arrow in FIG. 1, from the generally horizontal use position to an upright non-use position shown in FIG. 2. On the other hand, the seat back (SB) is ratatably supported on a support bracket (41) fixed on the floor (FL). Normally, as in FIG. 1, the seat back (SB) is set in a generally vertical use position and may be foldable forwardly and downwardly, as indicated by the arrow in FIG. 1, from the generally vertical use position to a generally horizontal non-use position shown in FIG. 2, so that the back side of the seat back (SB) can be used as an extended floor area in registry with the floor (FL).

As shown in FIG. 1, a body of the headrest (H) having a generally "inverted L" shape in section is movably mounted on the top of the seat back (SB). Such configuration of headrest body is known in the art, having a generally horizontal top portion (H2) and a vertically extending support portion (H1) adapted to support the head, shoulder portion and upper back portion of an occupant on the seat (S), as can be seen from FIG. 7.

In accordance with the present invention, with reference to FIGS. 3 to 7, the headrest (H) is comprised of a headrest frame assembly (HF) and an elastic headrest upholstery (Hc) covering the headrest frame assembly (HF).

Figure 3:
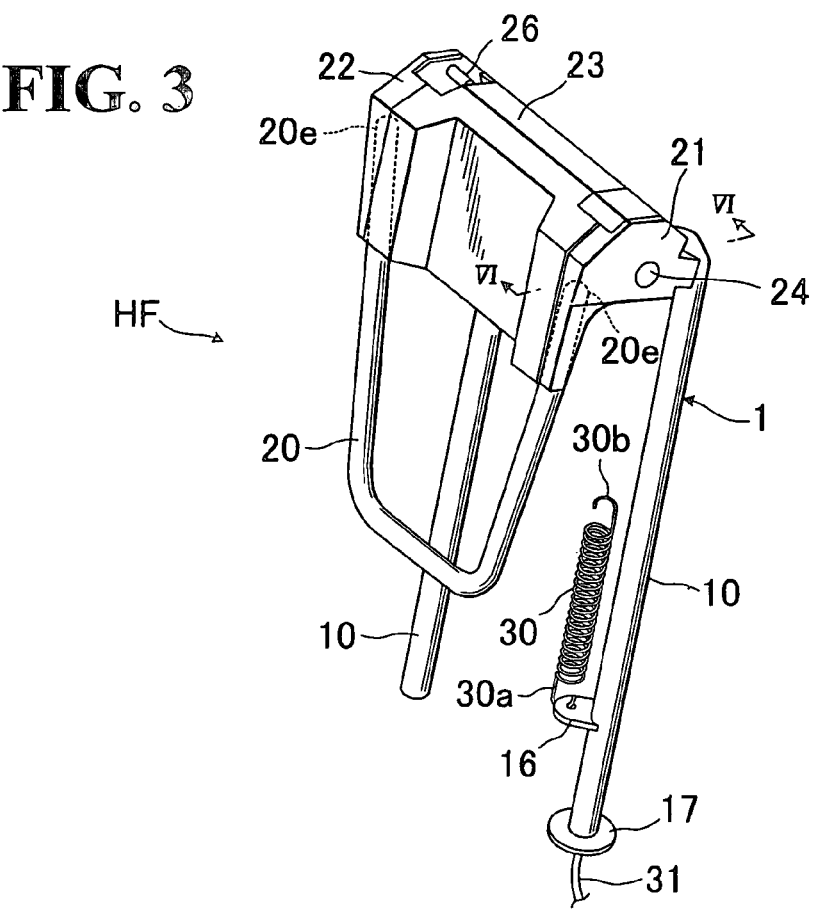
FIG. 3 is a schematic perspective view of a frame assembly of the headrest.
Figure 4:
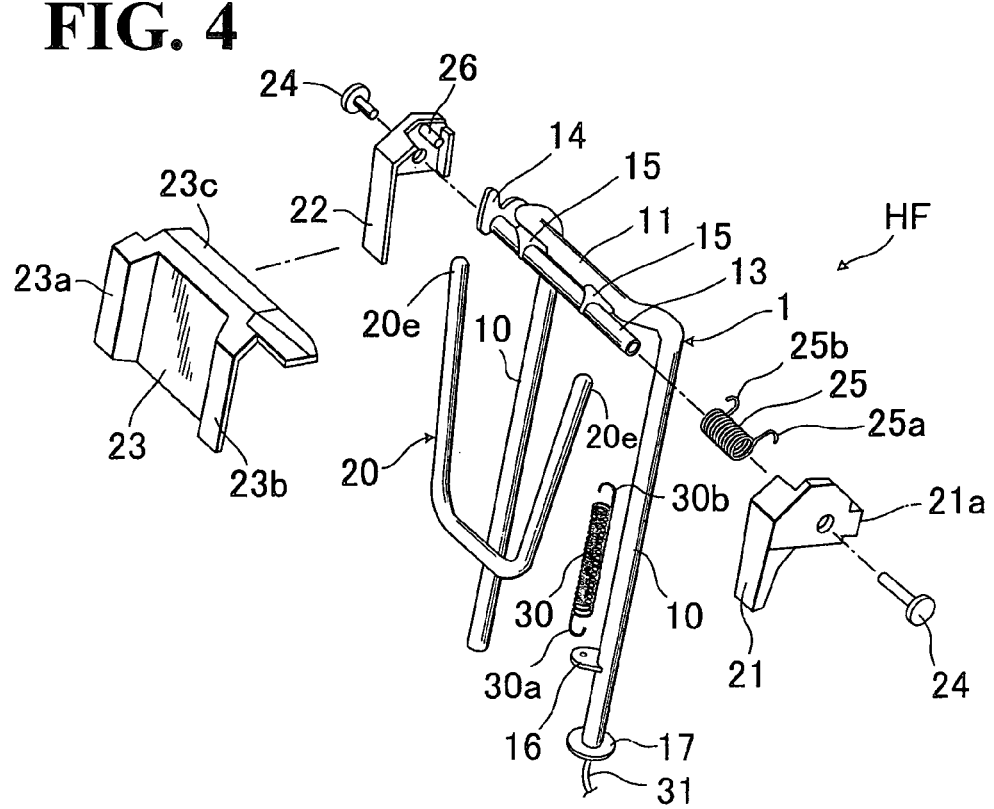
FIG. 4 is an exploded perspective view of the frame assembly of headrest.

As seen in FIGS. 3 and 4, in brief, the construction of the headrest frame assembly (HF) is such that a rotatable vertical support frame member (20) of generally "U" shape is biasingly and rotatably connected with a horizontal frame section (11) of a base frame member (1) of generally "inverted U" shape via a pair of first and second rotary frame pieces (21) (22) and a frontal cover frame piece (23) fixed to frame member (20).

More specifically, as best shown in FIG. 4, the base frame member (1) is formed to have: a pair of vertically extending stay portions (10) which constitute a pair of headrest stays for supporting the headrest (H) as known in the art; and a horizontal frame portion (11) extended horizontally between the two stay portions (10). A tubular cross support member (13) is fixed to and along that horizontal frame portion (11) by means of a pair of connecting brackets (15) (15). As shown in the FIG. 4, the first and second rotary frame pieces (21) (22) are each rotatably connected via a securing pin (24) with the respective two ends of the cross support member (13).

Fixed respectively to the first and second rotary frame pieces (21) (22) are two end portions (20e) (20e) of the vertical fame member (20) in such a manner as to extend downwardly therefrom.

As understandable from FIGS. 3 and 4, the frontal cover frame piece (23) is fixedly connected between those first and second rotary pieces (21) (22), such that the two lateral portions (23a) (23b) thereof are fixed with the first and second rotary frame pieces (21) (22), respectively, while the upper portion (23c) thereof is fixedly connected between the two upper areas respectively of the first and second rotary frame pieces (21) (22).

Figure 5:
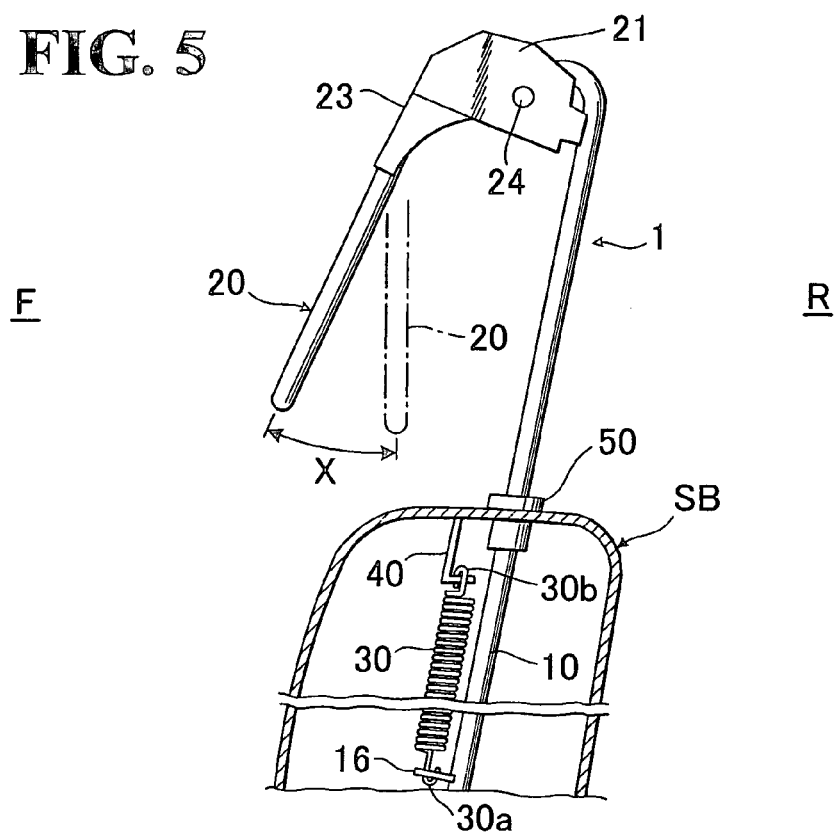
FIG. 5 is a partly broken side view showing a principal part of the present invention.

Hence, as shown in FIG. 5, the vertical support frame member (20) is rotatable clockwise and anticlockwise about the pins (24) or the central axis of the cross support member (13). Otherwise stated, the vertical support frame member (20) is swingable relative to the pins (24) in the forward direction (to the side F) and in the backward direction (to the side R) within a predetermined rotation range (X) as will be described below. Designation (25) denotes a spring for normally biasing both rotary frame pieces (21, 22) and vertical support frame member (20) in the forward direction As understandable from FIGS. 4 and 6, the spring (25) is wound about the tubular cross support member (13), such that one end (25a) thereof is securely engaged over the connecting bracket (15), while another end (25b) thereof securely engaged over a projection (21a) of the first rotary frame piece (21). This spring arrangement biasingly causes both first and second rotary frame pieces (21) (22) or the vertical support frame member (20) to rotate clockwise or in the forward direction.

Figure 6:
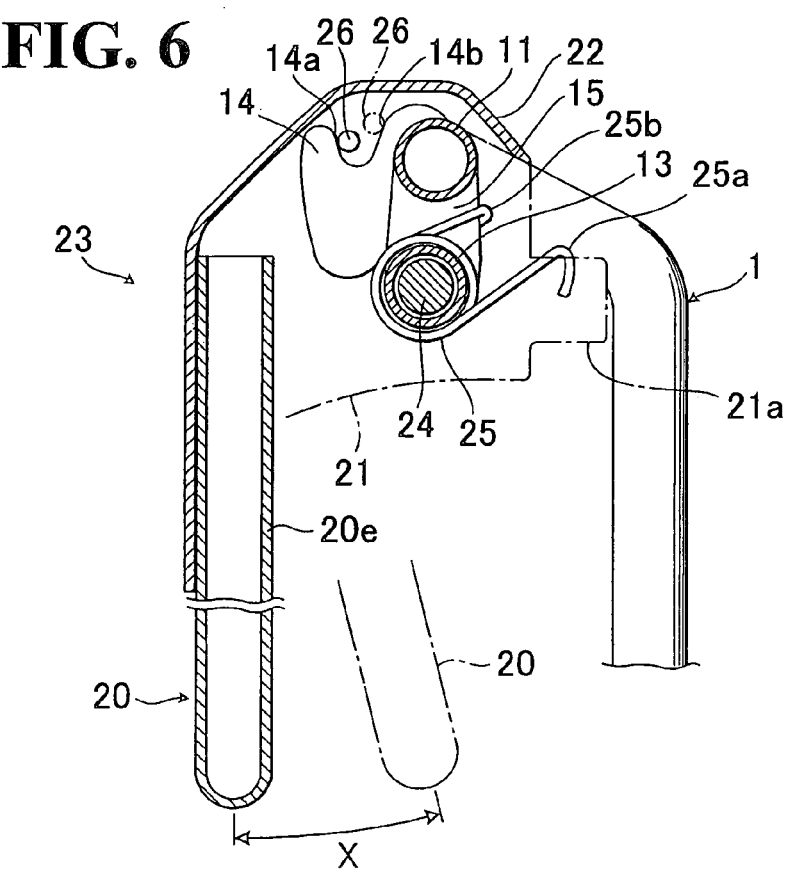
FIG. 6 is a sectional view taken along the line VI—VI in FIG. 3.

In this respect, the rotation range (X) of the vertical support frame member (20) is limited by a stopper pin (26) and a stopper plate (14) having a first stopper edge (14a) and a second stopper edge (14b). Specifically, as shown in FIGS. 4 and 6, the second rotary piece (22) has the stopper pin (26) fixed to the inner wall thereof, and the stopper bracket (14) is fixed on another end of the cross support member (13), such that the stopper pin (26) is disposed between the first and second stopper edges (14a) (14b) of the stopper bracket (14). Normally, under the biasing force of the spring (25), the stopper pin (26) is biasingly contacted with the first stopper edge (14a), thereby limiting the clockwise or forward rotation of the vertical support frame member (20). Conversely, the vertical support frame member (20) may be rotated anticlockwise or in the backward direction, overcoming the biasing force of spring (25), but its anticlockwise or backward rotation is limited because of the stopper pin (26) being brought to contact with the second stopper edge (14b), as indicated by the one-dot chain lines in FIG. 6.

As viewed from FIG. 5 in conjunction with FIG. 3, the two stay portions (10) of base frame member (1) are slidably inserted through a stay holder (50) fixed in the top of seat back (SB), such that, within the seat back (SB), one of the two stay portions (10) or the right-side stay portion (10) is provided with a biasing spring (30) for the purpose of biasing the base frame member (1) in upward direction. As shown, the biasing spring (30) is securely connected between a bracket (40) integral with the seat back (SB) and a securing lug (16) fixed to the right-side stay portion (10).

Fixed to the lower end of the right-side stay portion (10) is one end of a wire (31) which operatively connects the headrest (H) and seat back (SB) with the seat cushion (SC). As shown in FIGS. 1 and 3, one end of the wire (31) is securely connected with a securing member (17) fixed to the lower end of the right-side stay portion (10). The wire (31) extends outwardly from the lower end of seat back (SB) and further extends along the floor (FL) under the seat cushion (SC), terminating in another end connected with a securing bracket (32) fixed on the forward bottom area of the seat cushion (SC). As shown, the wire (31) is neatly and movably supported by a pair of retaining pieces (33) (34) upon the floor (FL).

As shown in FIG. 7, the upholstery (Hc), which comprises a foam padding (27) and a top cover member (28) covering the foam padding (27), is integrally and embracingly attached about the frontal cover frame piece (23), rotary frame pieces (21) (22) and vertical support frame member (20), excepting the two stay portions (10) of the base frame member (1), whereupon is formed a finally finished headrest (H) having the generally horizontal top portion (H2) and generally vertically extending support portion (H1), with the two stay portions (10) extending from the generally horizontal top portion (H2) and being slidably inserted in the seat back (SB) as described above.

In the normal use state shown in the FIG. 7, a seat occupant (P) can rest his or her head portion against the vertically extending support portion (H2) at a point indicated by (C1), while resting his or her shoulder and upper back portions thereagainst at a point indicated by (C2). As indicated by the arrow (L), the headrest (H) is resiliently biased in the forward direction by the spring (25), while being rotatable in the backward arrow direction (B), to thereby give a cushiony and comfortable support touch to the head, shoulder portion and upper back portion of the seat occupant (P). Also, the headrest (H) is limited by the stopper pin (26) and stopper bracket (14) as to its forward rotation within the forward and backward rotation range (X), so that the headrest is normally retained at a proper point to support the head, shoulder and upper back portions of seat occupant (P) who does not feel any unpleasant hard touch and/or forward protrusive touch there.

As shown in FIGS. 1 and 2, when the seat cushion (SC) is flipped upwardly and forwardly as indicated by the forward arrow, the wire (31) is pulled in the forward arrow direction, thereby in turn drawing the stay portions (10) donwardly, so that the headrest (H) is automatically lowered and contacted on and along the top and forward portions of the seat back (SB) as indicated by the two-dot chain lines in FIG. 2, thereby shortening a whole height of the seat back (SB). Thus, after having set the seat cushion (SC) at the upright non-use position as in FIG. 2, a whole of the seat back (SB) including the headrest (H) can be folded downwardly to the horizontal non-use position without contact and interference with the upright standing seat cushion (SC). It is noted here that the stay portions (10) are positively pulled by the wire (31) so as to retain the headrest (H) against accidental projection from the seat back (SB).

Conversely, as understandable by the arrows in FIG. 2, the seat back (SB) may be rotated upwardly and returned to the upright use position of FIG. 1, while the headrest is automatically raised from the top of seat back (SB) to the normal position of FIG. 1 under the biasing force e of the spring (10). After then, the seat cushion (SC) may be folded down to the normal horizontal use position as shown in FIG. 1.

While having described the present invention so far, it should be understood that the invention is not limited to the illustrated embodiment, but any other modification, replacement, and addition may be applied thereto without departing from the scopes of the appended claims.

What is claimed is:

1. A headrest in combination with a seat of a vehicle having a seat cushion and a seat back foldable downwardly, wherein said vehicle has a floor, wherein said seat cushion has a forward end portion facing forwardly of the vehicle, said forward end portion being rotatably connected with said floor so as to allow the seat cushion to be flipped over relative to said forward end portion to an upright non-use position, wherein said seatback is rotatably connected to said floor at the lower end portion thereof opposite to said top thereof, thereby allowing the seat back the be folded downwardly about said lower end portion to a horizontal non-use position, and wherein said seat back has a forward surface facing forwardly of said seat;

the headrest comprising:
a headrest body of a generally inverted L shape in section, which has a generally horizontal top portion and a generally vertical support portion extending vertically from said generally horizontal top portion, wherein said generally horizontal top portion is rotatably engaged to an at least one headrest stay element so that said generally vertical support portion is swingable relative to said headrest stay element in a forward direction and a backward direction of said seat;
said headrest stay element being slidably inserted through a top of said seat back, thereby allowing said headrest body to be vertically movable toward and away from the seat back; and
a wire provided between said seat cushion and said at last one headrest stay element, such that one end thereof is connected with the seat cushion and another end thereof is connected with the at least one headrest stay element;
with such an arrangement that, upon said seat cushion being flipped over to said upright non-use position, said wire is drawn in a direction to said seat cushion, which in turn causes said headrest stay element as well as said headrest body to move downwardly to said seat back, so that said generally horizontal top portion of said headrest body is contacted on said top of said seat back, while said generally vertical support portion of said headrest body is contacted on and along the upper region of said forward surface of said seat back, thereby allowing said seat back to be folded downwardly to said horizontal non-use position without contact of said headrest body with said seat cushion.

2. The headrest according to claim 1, wherein said generally vertical support portion of said headrest body is adapted to support head, shoulder and back portions of an occupant on said vehicle seat, and wherein said at least one headrest stay element is normally biased upwardly by a first biasing element provided in said seat back, such that said headrest body is resiliently retained at a predetermined point where said head, shoulder and back portions of said occupant is resiliently supported by said generally vertical support portion.

3. The headrest according to claim 2, wherein a second biasing element is provided for resiliently biasing said generally vertical support portion in said forward direction, and a stopper element is provided in said headrest body so as to limit rotation of the generally vertical support portion in the forward direction and further limit rotation of the generally vertical support portion in the backward direction.

4. The headrest according to claim 2, wherein the first biasing element is provided in said seat back so as to normally bias said at least one headrest stay element in upward direction, such that said headrest body is resiliently retained at a predetermined position, and wherein when said seat cushion is flipped over to said upright non-use position, said wire is drawn in a direction to said seat cushion, which in turn causes said at least one headrest stay element as well as said headrest body to move downwardly to said seat back, overcoming a biasing force of said first biasing element, to an extent that said generally horizontal top portion of said headrest body is contacted on said top of said seat back, while said generally vertical support portion of said headrest body is contacted on and along the upper region of said forward surface of said seat back, thereby allowing said seat back to be folded downwardly to said horizontal non-use position, without contact of said headrest body and said seat cushion.

* * * * *